Dec. 30, 1958 R. W. HUGHES 2,866,970

PULSE COMMUNICATION SYSTEM

Filed May 31, 1956

INVENTOR
ROBERT W. HUGHES
BY Alfred C. Hill
AGENT 2,866,970

PULSE COMMUNICATION SYSTEM

Robert W. Hughes, Mountain Lakes, N. J., assignor to International Telephone and Telegraph Corporation, Nutley, N. J., a corporation of Maryland Application May 31, 1956, Serial No. 588,298

18 Claims. (Cl. 343—203)

Figure 1:
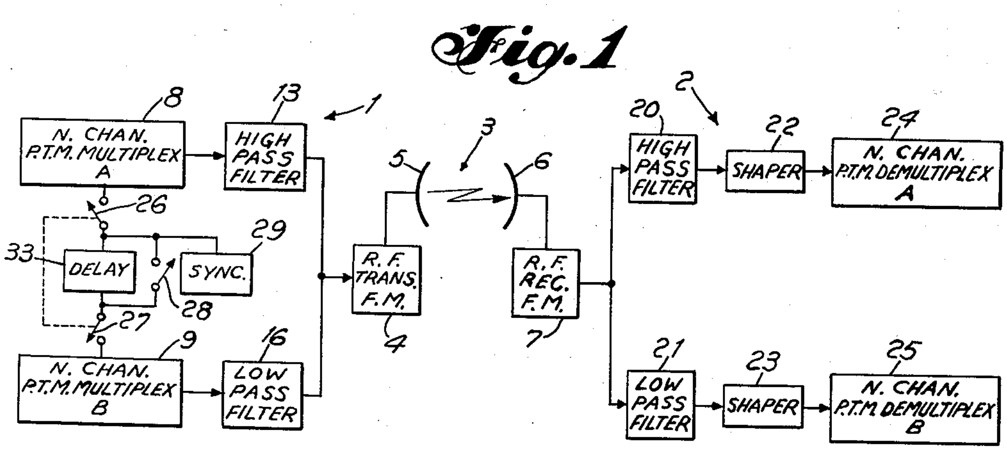

The invention relates to communication systems and more particularly to a pulse communication system enabling the sending of two separate and distinct pulse trains, each having at least one pulse modulated by information, over a single radio frequency transmission path.

Various types of pulse multiplex communication systems have been proposed wherein information is conveyed by pulses modulated in amplitude, time duration, time or pulse position, or pulse code combinations. In these systems, where it is desired to transmit the pulses by radio frequency energy or carrier for the purpose of radiation or for other types of carrier transmission, a carrier wave may be modulated by these pulses either in phase or frequency. Such systems have been installed in various locations and the terminal equipment and repeaters are presently designed for a given carrier frequency operation. As traffic increases, it may become necessary to increase the number of channels transmitted by a given carrier. If this is done by interposing additional channels in the spacing between the pulses already in use, considerable trouble, due to cross modulation, may occur. Two proposals have been presented to reduce this cross modulation.

One proposal submits that two trains of pulses be separately modulated so that, for example, the odd pulses are modulated in one modulator and the even pulses in a separate modulator. These separate trains are then combined on a time basis so as to space the pulses of one modulator in the time interval intermediate the pulses from the other modulator. This reduces cross modulation or cross talk introduced in the modulator systems but still troublesome cross talk may arise in the other parts of the transmission system.

A second proposal submits that two separate trains of pulses be individually modulated in separate pulse modulators. The pulses from one of these modulators are then inverted in polarity with respect to the pulses of the other train and these two trains of pulses are then used to angularly modulate a source of carrier frequency. Thus, the common carrier may carry both messages. At the receiver end of the system, the angularly modulated carrier is received and detected to reproduce the original modulating pulse pattern. Pulses of the two patterns or pulse trains are then separated, for example, in a clipper separator. One of these trains of pulses may then be inverted and the two trains applied to separate pulse demodulator equipment. It will be recognized that with such a system the modulation and demodulation terminal equipment may be simply duplicated at each terminal to provide the extra channels, the additional equipment required merely being the necessary phasing circuit for the modulation, the inverter circuits, the mixer circuits and the separating circuits.

An object of this invention is to provide still another solution to the problem of increasing the number of channels carried on a single radio frequency wave or carrier signal requiring less additional equipment than the previously proposed solutions.

Another object of this invention is to provide a system which will double the capacity of a carrier transmission system without the addition of other carrier frequencies and to minimize the cross talk in such a system.

In accordance with the principles of this invention, acceptable transmission of intelligence by the method of this invention is accomplished when the pulses of the pulse trains have a constant amplitude and a constant width. Thus, the means for carrying out the principles of this invention may be employed with a pulse time modulation (P. T. M.) type of pulse signal or a pulse code modulation (P. C. M.) type of pulse signal where the pulse representing the "on" position of a code element returns to a zero level between consecutive pulses of the code signal. If the method of this invention is employed in a pulse amplitude modulation (P. A. M.) or a pulse width modulation (P. W. M.), the cross talk or cross modulation will be increased and affords no advantage, in fact, the transmission of intelligence will deteriorate.

Therefore, still another object of this invention is to provide means for operation on two separate pulse trains each including discrete pulse signals of constant width and constant amplitude to increase the capacity of a carrier transmission system without the addition of other carrier frequencies and to minimize the cross talk in such a system.

According to a feature of my invention, two separate trains of pulses are individually modulated in separate pulse modulators without changing the shape characteristic of the pulses of the train of pulses. The pulses from one of these modulators are coupled to a means to pass only certain frequency components, say the low frequency components, of the pulses. The pulses from the other of these modulators are coupled to a means to pass only other certain frequency components, say the high frequency components, of the pulses. The high frequency component pulse trains and the low frequency component pulse trains are combined or multiplexed and used to angularly modulate the carrier frequency of a transmitter. Thus, the common carrier or radio frequency energy may carry the messages of both pulse trains. At the receiver end of the system, the angularly modulated carrier is received. The output of the receiver is passed to a means for separating the said certain frequency components from the multiplexed signals and also to a means for separating the said other certain frequency components from the multiplexed signals. These separated frequency components are independently shaped to restore their original form and then applied to separate demodulator equipment. It will be recognized that with such a system the modulation and demodulation terminal equipment may be simply duplicated at each terminal to provide the extra channels, the additional equipment required merely being a low-pass and high-pass filter at each of the terminals.

Figure 2:
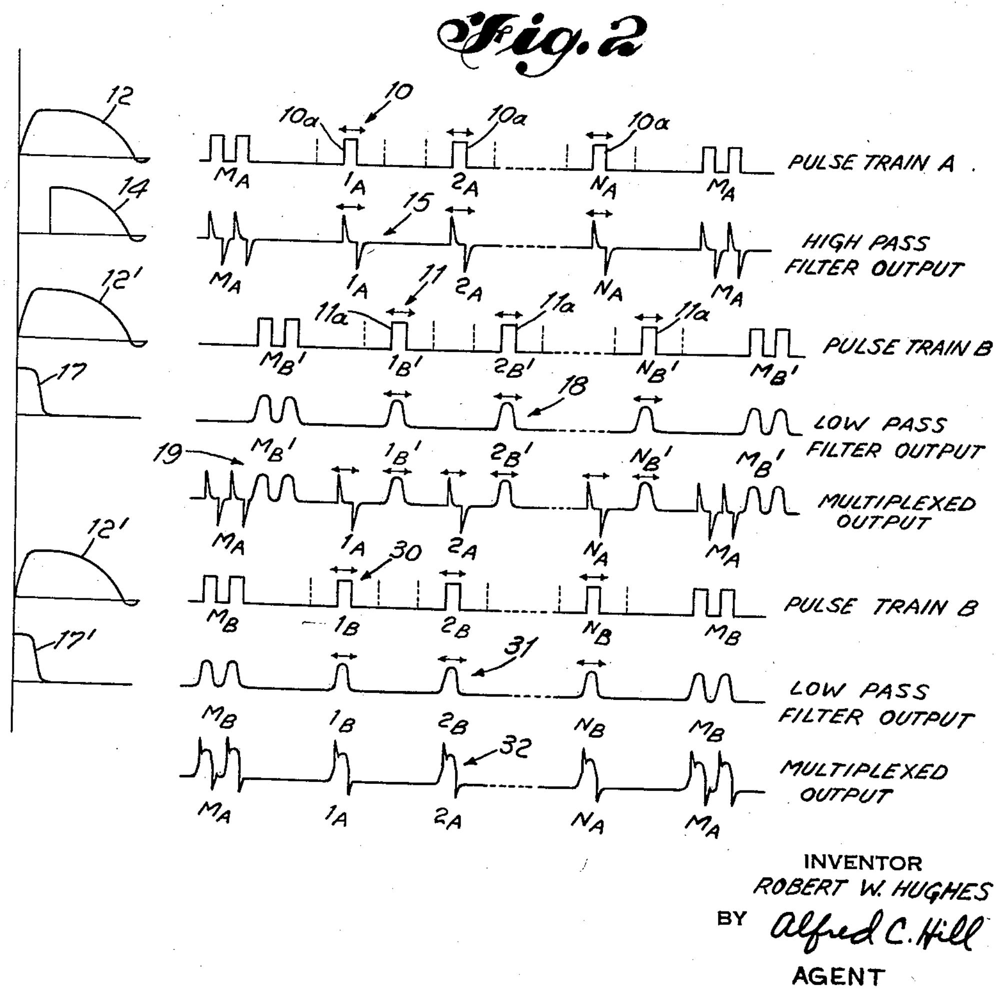

The above-mentioned and other features and objects of this invention will become more apparent by reference to the following description taken in conjunction with the accompanying drawings, in which:

Fig. 1 illustrates in block schematic form a system incorporating the features of this invention; and Fig. 2 illustrates a series of curves useful in explaining the operation of the system of Fig. 1.

In the remainder of the description, I will describe my invention in conjunction with a P. T. M. type communication system, but it is to be remembered that my invention will operate with any pulse system that employs discrete pulses of constant width and constant amplitude.

Referring to Fig. 1, reference character 1 represents generally a transmitting circuit incorporating features of this invention and reference character 2 a receiving circuit incorporating the features of my invention. Reference character 3 represents generally a transmission path between circuits 1 and 2 illustrated herein as a radiation transmission path. However, it is to be understood that path 3 may be a wire transmission path. Transmitting circuit 1 includes a transmitter 4 to radiate a carrier wave of a given frequency from antenna 5 for transmission along path 3. The carrier wave of transmitter 4 is angularly modulated by the pulses carrying the information. In the illustration of Fig. 1, transmitter 4 is a frequency modulation transmitter and thus the carrier wave is frequency modulated by the pulse signals carrying the information or intelligence. The frequency modulated carrier wave on path 3 is received by antenna 6 and coupled to frequency modulation receiver 7 where the radio frequency carrier wave is demodulated to recover the video signal transmitted from transmitter 4. Thus, the transmission along path 3 is accomplished by a single carrier wave at a given frequency.

The system of this invention provides a means to increase the number of channel signals carried by the carrier wave of transmitter 4. In accordance with this invention, two pulse trains of time interleaved channel pulses of the P. T. M. type are coupled from multiplexes 8 and 9 which may be any known form of P. T. M. channel signal modulators and multiplexers. The pulse train outputs are illustrated respectively by curves 10 and 11 of Fig. 2. It will be noted in curves 10 and 11 that pulses **10*a* and 11*a*, the channel pulses of the pulse train, are changed in time position in accordance with the information signal to indicate the amplitude of the information signal. This time position modulation of the channel pulse is carried out in separate channel modulators and at the outputs thereof are multiplexed on a time basis to provide the train of pulses. The limits of time modulation are illustrated in curves 10 and 11 by the vertical dotted lines on each side of the channel pulses. The plurality of channel modulators, source of channel pulses and time multiplexing equipment are included in sources 8 and 9. These pulse trains have a bandwidth characteristic as illustrated by curves 12 and 12', that is, the square wave pulses of pulse trains 10 and 11 include both high and low frequency components. Normally, one or the other of pulse trains 10 and 11 would be coupled directly to transmitter 4**. If the two pulse trains were time interleaved as in the past for increasing the number of channels, undesired cross modulation would result in the system.

However, in accordance with this invention, pulse trains 10 and 11 may be multiplexed on a frequency basis in the following manner without having undesired cross modulation.

The pulse train 10 from source 8 is coupled to high-pass filter 13 having a band-pass characteristic as illustrated in curve 14 of Fig. 2. Filter 13 thus passes only the high frequency components of the pulses of pulse train 10. This is illustrated by the differentiated waveform 15 of Fig. 2. At the same time, pulse train 11 from source 9 is coupled to low-pass filter 16 having a band-pass characteristic as illustrated in curve 17 of Fig. 2. Filter 16 thus passes only the low frequency components of the pulses of pulse train 11. The resultant waveform at the output of filter 16 is illustrated in curve 18 of Fig. 2.

The outputs of filters 13 and 16 are coupled to transmitter 4 wherein the low frequency component pulse train is combined or multiplexed with the high frequency component pulse train as illustrated in curve 19 of Fig. 2. Thus, the capacity to the carrier wave of transmitter 4 has been substantially increased by employing frequency separation of two separate and distinct pulse trains.

The filtering process does not reduce the information carrying quality of the channel pulse of the pulse trains to a detrimental level. In the practice of this invention, filter 13 passes a frequency band of 1 to 3 megacycles of the total frequency band of 0 to 3 megacycles of the pulses of pulse train 10 and filter 16 passes a frequency band of 0 to 1 megacycle of the total frequency band of 0 to 3 megacycles of the pulses of pulse train 11. At these frequency bandwidths, the intelligence is still retained and the two bandwidths can be transmitted simultaneously without interference.

The above-produced frequency multiplexed pulse trains frequency modulate the carrier wave of transmitter 4 and are radiated to receiver 7 wherein the video pulses of curve 19, Fig. 2, are recovered. The output of receiver 7, curve 19 of Fig. 2, is coupled simultaneously to high-pass filter 20 and low-pass filter 21. High-pass filter 20 separates from the output waveform of receiver 7 the high frequency component waveform, curve 15 of Fig. 2, and low-pass filter 21 separates from the output of receiver 7 the low frequency component waveform, curve 18 of Fig. 2. The respective outputs of filters 20 and 21 are coupled to shapers 22 and 23 to restore the frequency component waveforms to a waveform approximating the original square pulse waveforms and thereby restore a good portion of the original frequency components. This enhances the transmission of intelligible information by the system of this invention. The outputs from shapers 22 and 23 are coupled to pulse train demultiplexers 24 and 25 wherein the intelligence inserted in the pulses of the pulse trains at multiplexers 8 and 9 is recovered. The demultiplexers may be any known type of channel demodulator and separator wherein the individual time modulated channel pulses are separated from the pulse train and operated on in separate demodulators to convert the P. T. M. channel pulse to a width modulated pulse and hence to the information signal.

The system above described needs no synchronization whatsoever. Without synchronization the pulse trains 10 and 11 would be randomly timed with respect to each other. If viewed on an oscilloscope, trains 10 and 11 would appear to be moving past each other.

If desired, sources 8 and 9 could be synchronized by closing switches 26, 27 and 28 thereby applying a synchronizing signal from source 29 simultaneously to sources 8 and 9. This would result in identical timing of the pulse train outputs of sources 8 and 9 as illustrated by curves 10 and 30. The filtering operation on curve 30 would produce curve 31 which when multiplexed with curve 15 appears as illustrated in curve 32.

Another possibility of timing the pulse train output, the preferred modification, is to provide a given time displacement between the pulse trains 10 and 11, the outputs of source 8 and 9. This is accomplished by opening switch 28 and closing switches 26 and 27 to enable the output of sync source 29 to be applied directly to source 8 and through delay 33 to source 9 to provide a given time delay between trains 10 and 11 as illustrated in Fig. 2.

It will be observed that when the pulse trains are synchronized, either simultaneously timed or timed to be displaced with respect to each other, there is no need for synchronization at receiving circuit 2.

By employing the system of this invention, several variations, modifications and improvements to existing equipment are apparent. A few of these are: (1) both pulse trains could be 46 channel signals, thus giving a total of 92 channels; (2) the two pulse trains could be synchronized and interleaved to avoid overloading of the radio frequency transmitting equipment and/or improve signal-to-noise; and (3) if not synchronized, this permits two totally independent P. T. M. systems to use the same transmission path, thereby giving the possibility of cost sharing by two operating companies.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse communication system enabling the sending of two separate and distinct pulse signals over a single radio frequency transmission path comprising a first source of pulses modulated by information signals in a characteristic other than a shape characteristic of the pulses, a second source of pulses modulated by information signals in a characteristic other than a shape characteristic of the pulses, a mean coupled to said first source to pass only certain frequency components of the pulses of said first source, a means coupled to said second source to pass only other certain frequency components of the pulses of said second source, an angularly modulated radio frequency transmitter coupled in common to the output of each of said means for multiplexing and transmitting the outputs thereof over a given radio frequency transmission path, a receiver for receiving the multiplexed pulses from said radio frequency path, a means coupled to the output of said receiver for separating said certain frequency components from the multiplexed signals and operating thereon to recover the pulse carried information of said second source, and a means coupled to the output of said receiver for separating said other certain frequency components from the multiplexed signals and operating thereon to recover the pulse carried information of said first source.

2. A system according to claim 1, wherein said angularly modulated radio frequency transmitter is a frequency modulation radio frequency transmitter.

3. A pulse communication system enabling the sending of two separate and distinct pulse signals over a single radio frequency transmission path comprising a first source of distinct constant width, constant amplitude pulses modulated by information signals, a second source of distinct constant width, constant amplitude pulses modulated by information signals, a means coupled to said first source to pass only certain frequency components of the pulses of said first source, a means coupled to said second source to pass only other certain frequency components of the pulses of said second source, a frequency modulation radio frequency transmitter coupled in common to the output of each of said means for multiplexing and transmitting the outputs thereof over a given radio frequency transmission path, a receiver for receiving the multiplexed pulses from said radio frequency path, a means coupled to the output of said receiver for separating said certain frequency components from the multiplexed signals and operating thereon to recover the pulse carried information of said second source, and a means coupled to the output of said receiver for separating said other certain frequency components from the multiplexed signals and operating thereon to recover the pulse carried information of said first source.

4. A pulse communication system enabling the sending of two separate and distinct pulse signals over a single radio frequency transmission path comprising a first source of distinct constant width, constant amplitude pulses modulated by information signals, a second source of distinct constant width, constant amplitude pulses modulated by information signals, a means coupled to said first source to pass only the high frequency components of the pulses of said first source, a means coupled to said second source to pass only the low frequency components of the pulses of said second source, a frequency modulation radio frequency transmitter coupled in common to the output of each of said means for multiplexing and transmitting the outputs thereof over a given radio frequency transmission path, a receiver for receiving the multiplexed pulses from said radio frequency path, a means coupled to the output of said receiver for separating said low frequency components from the multiplexed signals and operating thereon to recover the pulse carried information of said second source, and a means coupled to the output of said receiver for separating said high frequency components from the multiplexed signals and operating thereon to recover the pulse carried information of said first source.

5. A pulse communication system enabling the sending of two separate and distinct pulse signals over a single radio frequency transmission path comprising a first source of pulse trains including a plurality of distinct constant width, constant amplitude pulses modulated by information signals, a second source of pulse trains including a plurality of distinct constant width, constant amplitude pulses modulated by information signals, a means coupled to said first source to pass only the low frequency components of the pulses of said first source, a means coupled to said second source to pass only the high frequency components of the pulses of said second source, a frequency modulation radio frequency transmitter coupled in common to the output of each of said means for multiplexing and transmitting the outputs thereof over a given radio frequency transmission path, a receiver for receiving the multiplexed pulses from said radio frequency path, a means coupled to the output of said receiver for separating said low frequency components from the multiplexed signals and operating thereon to recover the pulse carried information of said second source, and a means coupled to the output of said receiver for separating said high frequency components from the multiplexed signals and operating thereon to recover the pulse carried information of said first source.

6. A pulse communication system enabling the sending of two separate and distinct pulse signals over a single radio frequency transmission path comprising a first source of pulse trains including a plurality of distinct constant width, constant amplitude pulses modulated by information signals, a second source of pulse trains including a plurality of distinct constant width, constant amplitude pulses modulated by information signals, means coupled to said sources to cause the pulses of one pulse train to be timed to be intermediate the pulses of the other pulse train, a means coupled to said first source to pass only the low frequency components of the pulses of said first source, a means coupled to said second source to pass only the high frequency components of the pulses of said second source, a frequency modulation radio frequency transmitter coupled in common to the output of each of said means for multiplexing and transmitting the outputs thereof over a given radio frequency transmission path, a receiver for receiving the multiplexed pulses from said radio frequency path, a means coupled to the output of said receiver for separating said low frequency components from the multiplexed signals and operating thereon to recover the pulse carried information of said second source, and a means coupled to the output of said receiver for separating said high frequency components from the multiplexed signals and operating thereon to recover the pulse carried information of said first source.

7. A pulse communication system enabling the sending of two separate and distinct pulse signals over a single radio frequency transmission path comprising a first source of pulse trains including a plurality of distinct constant width, constant amplitude pulses modulated by information signals, a second source of pulse trains including a plurality of distinct constant width, constant amplitude pulses modulated by information signals, the pulse trains of said first and second sources being randomly timed with respect to each other, a means coupled to said first source to pass only the low frequency components of the pulses of said first source, a means coupled to said second source to pass only the high frequency components of the pulses of said second source, a frequency modulation radio frequency transmitter coupled in common to the output of each of said means for multiplexing and transmitting the outputs thereof over a given radio frequency transmission path, a receiver for receiving the multiplexed pulses from said radio frequency path, a means coupled to the output of said receiver for separating said low frequency components from the multiplexed signals and operating thereon to recover the pulse carried information of said second source, and a means coupled to the output of said receiver for separating said high frequency components from the multiplexed signals and operating thereon to recover the pulse carried information of said first source.

8. A pulse communication system enabling the sending of two separate and distinct pulse signals over a single radio frequency transmission path comprising a first source of pulse trains including a plurality of distinct constant width, constant amplitude pulses modulated by information signals, a second source of pulse trains including a plurality of distinct constant width, constant amplitude pulses modulated by information signals, a low-pass filter coupled to said first source to pass only low frequency components of the pulses of said first source, a high-pass filter coupled to said second source to pass only high frequency components of the pulses of said second source, a frequency modulation radio frequency transmitter coupled in common to the output of each of said filters for multiplexing and transmitting the outputs thereof over a given radio frequency transmission path, a receiver for receiving the multiplexed pulses from said radio frequency path, a low-pass filter coupled to the output of said receiver for separating said low frequency components from the multiplexed signals, and a high-pass filter coupled to the output of said receiver for separating said high frequency components from the multiplexed signals.

9. A system according to claim 8, wherein the pulse trains of said first and second sources are randomly timed with respect to each other.

10. A pulse communication system enabling the sending of two separate and distinct pulse signals over a single radio frequency transmission path comprising a first source of pulse trains including a plurality of distinct constant width, constant amplitude pulses modulated by information signals, a second source of pulse trains including a plurality of distinct constant width, constant amplitude pulses modulated by information signals, means coupled to said first and second sources to control the timing of one pulse train with respect to the other pulse train, a low-pass filter coupled to said first source to pass only low frequency components of the pulses of said first source, a high-pass filter coupled to said second source to pass only high frequency components of the pulses of said second source, a frequency modulation radio frequency transmitter coupled in common to the output of each of said filters for multiplexing and transmitting the outputs thereof over a given radio frequency transmission path, a receiver for receiving the multiplexed pulses from said radio frequency path, a low-pass filter coupled to the output of said receiver for separating said low frequency components from the multiplexed signals, and a high-pass filter coupled to the output of said receiver for separating said high frequency components from the multiplexed signals.

11. A pulse communication system enabling the sending of two separate and distinct pulse signals over a single radio frequency transmission path comprising a first source of pulse trains including a plurality of distinct constant width, constant amplitude pulses modulated by information signals, a second source of pulse trains including a plurality of distinct constant width, constant amplitude pulses modulated by information signals, a source of synchronizing signals, means coupling said source of synchronizing signals directly to said first source and a delay means coupling said synchronizing signals to said second source to time the pulses of one pulse train to occur intermediate the pulses of the other pulse train, a low-pass filter coupled to said first source to pass only low frequency components of the pulses of said first source, a high-pass filter coupled to said second source to pass only high frequency components of the pulses of said second source, a frequency modulation radio frequency transmitter coupled in common to the output of each of said filters for multiplexing and transmitting the outputs thereof over a given radio frequency transmission path, a receiver for receiving the multiplexed pulses from said radio frequency path, a low-pass filter coupled to the output of said receiver for separating said low frequency components from the multiplexed signals, and a high-pass filter coupled to the output of said receiver for separating said high frequency components from the multiplexed signals.

12. In a pulse communication system, a transmitting circuit enabling the sending of two separate and distinct pulse signals over a single radio frequency transmission path comprising a first source of pulse trains including a plurality of distinct constant width, constant amplitude pulses modulated by information signals, a second source of pulse trains including a plurality of distinct constant width, constant amplitude pulses modulated by information signals, a means coupled to said first source to pass only certain frequency components of the pulses of said first source, a means coupled to said second source to pass only other certain frequency components of the pulses of said second source, and a frequency modulation radio frequency transmitter coupled in common to the output of each of said means for multiplexing and transmitting the outputs thereof over a given radio frequency transmission path.

13. In a pulse communication system, a transmitting circuit enabling the sending of two separate and distinct pulse signals over a single radio frequency transmission path comprising a first source of pulse trains including a plurality of distinct constant width, constant amplitude pulses modulated by information signals, a second source of pulse trains including a plurality of distinct constant width, constant amplitude pulses modulated by information signals, a low-pass filter coupled to said first source to pass only low frequency components of the pulses of said first source, a high-pass filter coupled to said second source to pass only high frequency components of the pulses of said second source, and a frequency modulation radio frequency transmitter coupled in common to the output of each of said filters for multiplexing and transmitting the outputs thereof over a given radio frequency transmission path.

14. In a pulse communication system, a transmitting circuit enabling the sending of two separate and distinct pulse signals over a single radio frequency transmission path comprising a first source of pulse trains including a plurality of distinct constant width, constant amplitude pulses modulated by information signals, a second source of pulse trains including a plurality of distinct constant width, constant amplitude pulses modulated by information signals, a source of synchronizing signals, means coupling said source of synchronizing signals directly to said first source and a delay means coupling said synchronizing signals to said second source to time the pulses of one pulse train to occur intermediate the pulses of the other pulse train, a low-pass filter coupled to said first source to pass only low frequency components of the pulses of said first source, a high-pass filter coupled to said second source to pass only high frequency components of the pulses of said second source, and a frequency modulation radio frequency transmitter coupled in common to the output of each of said filters for multiplexing and transmitting the outputs thereof over a given radio frequency transmission path.

15. In a pulse communication system wherein a single radio frequency energy is frequency modulated with two pulse trains, the pulses of one pulse train being only certain frequency components of the distinct constant width, constant amplitude, information modulated pulses of a rectangular wave pulse train and the pulses of the other pulse train being only other certain frequency components of the distinct width, constant amplitude, information modulated pulses of a rectangular wave pulse train, means for receiving the modulated radio frequency energy, a means coupled to the output of said receiving means for separating said certain frequency components from the received signal and operating thereon to recover the pulse carried information of said one pulse train, and a means coupled to the output of said receiving means for separating said other certain frequency components from the received signal and operating thereon to recover the pulse carried information of said other pulse train.

16. In a pulse communication system wherein a single radio frequency energy is frequency modulated with two pulse trains, the pulses of one pulse train being only low frequency components of the distinct constant width, constant amplitude, information modulated pulses of a rectangular wave pulse train and the pulses of the other pulse train being only high frequency components of the distinct constant width, constant amplitude, information modulated pulses of a rectangular wave pulse train, means for receiving the modulated radio frequency energy, a low-pass filter coupled to the output of said receiving means for separating said low frequency components from the received signal and operating thereon to recover the pulse carried information of said one pulse train, and a high-pass filter coupled to the output of said receiving means for separating said high frequency components from the received signal and operating thereon to recover the pulse carried information of said other pulse train.

17. In a pulse communication system, a transmitting circuit enabling the sending of two separate and distinct pulse signals over a single radio frequency transmission path comprising a first source of pulses having a given configuration modulated by information signals, a second source of pulses having a configuration similar to said given configuration modulated by different information signals, and means to transmit only given frequency components of said first source and other frequency components of said second source different from said given frequency components.

18. In a pulse communication system, a transmitting circuit enabling the sending of two separate and distinct pulse signals over a single radio frequency transmission path comprising a first source of pulses having a given configuration modulated by information signals, a second source of pulses having a configuration similar to said given configuration modulated by different information signals, means coupled to said first source to suppress certain frequency components and pass other frequency components of the pulses of said first source, means coupled to said second source to suppress said other frequency components and to pass said certain frequency components of the pulses of said second source and a frequency modulation radio frequency transmitter coupled in common to the output of each of said means for transmitting only the frequency components of the pulses of said sources passed by said means.

References Cited in the file of this patent

UNITED STATES PATENTS

| | | |
|---|---|---|
| 2,433,343 | Chatterjea et al. | Dec. 30, 1947 |
| 2,452,547 | Chatterjea et al. | Nov. 2, 1948 |
| 2,607,035 | Levine | Aug. 12, 1952 |
| 2,677,720 | Bedford | May 4, 1954 |